US006968752B2

(12) United States Patent
Shimada

(10) Patent No.: US 6,968,752 B2
(45) Date of Patent: Nov. 29, 2005

(54) DRIVE SHAFT MOVING DEVICE

(76) Inventor: Toshiaki Shimada, 41-2, Kawauchi 2-chome, Asaminami-ku, Hiroshima-shi, Hiroshima (JP) 731-0102

( * ) Notice: Subject to any disclaimer, the term of this patent is extended or adjusted under 35 U.S.C. 154(b) by 37 days.

(21) Appl. No.: 10/275,662

(22) PCT Filed: Jul. 25, 2001

(86) PCT No.: PCT/JP01/06433
§ 371 (c)(1),
(2), (4) Date: Nov. 8, 2002

(87) PCT Pub. No.: WO02/16804
PCT Pub. Date: Feb. 28, 2002

(65) Prior Publication Data
US 2003/0145668 A1 Aug. 7, 2003

(30) Foreign Application Priority Data
Aug. 21, 2000 (JP) .............................. 2000-249466

(51) Int. Cl.[7] .......................... F16H 25/22; F16H 25/24
(52) U.S. Cl. .................... 74/89.23; 74/89.34; 74/89.36
(58) Field of Search ........................... 74/89.23, 89.36, 74/89.37, 89.39, 89.31, 89.34

(56) References Cited

U.S. PATENT DOCUMENTS

| 3,505,888 | A |   | 4/1970 | Denkowski et al. ....... 74/89.15 |
| 4,939,946 | A | * | 7/1990 | Teramachi .................. 74/89.3 |

(Continued)

FOREIGN PATENT DOCUMENTS

| FR | 1399664    | 4/1964  |
| JP | 63-9547    | 1/1988  |
| JP | 63-81658   | 5/1988  |
| JP | 63-312562  | 12/1988 |
| JP | 01-206153  | 8/1989  |
| JP | 02-113153  | 4/1990  |
| JP | 05-176497  | 7/1993  |
| JP | 05-180299  | 7/1993  |
| JP | 06-43406   | 6/1994  |
| JP | 06-53851   | 7/1994  |
| JP | 06-213735  | 8/1994  |

OTHER PUBLICATIONS

English translation of portion of Mar. 5, 2004 Notification of Reasons of Refusal for Japanese Patent Application 2000-249466. The translation includes a discussion of references B9-B11.

(Continued)

Primary Examiner—William C. Joyce
(74) Attorney, Agent, or Firm—Fulbright & Jaworski L.L.P.

(57) ABSTRACT

A drive shaft moving apparatus of the present invention includes a drive shaft 1 with a screw groove 3 formed in spiral shape, and a nut 5 fitted around the drive shaft 1 and being rotatably supported on a main flame 15 so as to allow the drive shaft 1 to axially move. The apparatus is characterized in that a fixing means 17 is provided on a side of the main flame 15 for preventing the drive shaft 1 from rotating, the fixing means 17 includes a guided member 24 being capable of moving along a guide member 4 formed on the drive shaft 1 in the axial direction, and the guided member 24 is disposed between the nut 5 and the drive shaft 1.

6 Claims, 7 Drawing Sheets

U.S. PATENT DOCUMENTS 5,094,118 A * 3/1992 Morita .................. 74/89.31
5,121,647 A * 6/1992 Teramachi ............... 74/89.3
5,228,353 A * 7/1993 Katahira et al. ......... 74/89.3
5,231,888 A * 8/1993 Katahira ................ 74/89.3

OTHER PUBLICATIONS

English translation of portion of B10.
English translation of portion of B11.

* cited by examiner

US 6,968,752 B2

DRIVE SHAFT MOVING DEVICE

FIELD OF THE INVENTION

This invention relates to a drive shaft moving apparatus that is capable of being properly utilized for machine tools, robots or other industrial machine units.

BACKGROUND OF THE INVENTION

Hitherto, a drive shaft moving apparatus of this type is known for example in Japanese Unexamined Patent Publication No. Hei-5-180299, which, as illustrated in FIG. 7, includes drive shaft 53 with an outer circumferential surface on which ball screw groove 50 and ball spline groove 51 are respectively formed, ball screw nut 55 provided in engagement with the ball screw groove 50 and ball spline nut 56 provided in engagement with the ball spline groove 51. The respective nuts 55, 56 are supported on a main flame (not shown) via bearings in such a manner as to be rotatable or stoppable.

The drive shaft 53 is slid in the axial direction and hence moved forward and backward by the rotation of the ball screw nut 55. The ball spline nut 56 engaged with the ball spline groove acts to prevent the rotation of the drive shaft 53.

Such a conventional drive shaft moving apparatus has the ball screw nut 55 provided spaced apart from the ball spline nut 56. This arrangement requires separate spaces for accommodating the ball screw nut 55 and the ball spline nut 56 along the lengthwise direction of the drive shaft 53, and hence necessitates increase in size of a unit incorporated with this drive shaft moving apparatus. Particularly, this arrangement is disadvantageous for use in robots or the like, which are required to be downsized.

Accordingly, it is an object of the present invention to downsize the entire unit by replacing the conventional ball spline nut with a fixing means which is interposed between the ball screw nut and the drive shaft, thereby restraining the rotation of the drive shaft.

SUMMARY OF THE INVENTION

To achieve the above object according to the present invention, in a drive shaft moving apparatus which includes a drive shaft with a screw groove formed in a spiral shape, and a nut fitted around the drive shaft and being rotatably supported on a main flame so as to allow the drive shaft to axially move, a fixing means is provided on a side of the main flame for preventing the drive shaft from rotating. The fixing means includes a guided member being capable of moving along a guide member formed on the drive shaft in the axial direction. The guided member is disposed between the nut and the drive shaft.

Also, according to the present invention, in a drive shaft moving apparatus which includes a drive shaft with a screw groove formed in a spiral shape, and a ball screw nut fitted around the drive shaft via balls rolling along the screw groove and being rotatably supported on a main flame so as to allow the drive shaft to axially move, a fixing means is provided on a side of the main flame for preventing the drive shaft from rotating. The fixing means includes a guided member being capable of moving along a guide member formed on the drive shaft in the axial direction. The guided member is disposed between the nut and the drive shaft in such a manner as to allow the balls to roll thereover.

Since the fixing means is interposed between the nut and the drive shaft so as to prevent the rotation of the drive shaft, a machine unit can relatively easily be downsized than by the arrangement with a ball spline nut and a ball screw nut, which are formed separately and fitted around the drive shaft with a space between the ball spline nut and the ball screw nut.

Also, the guided member may form thereon a screw groove having the same pitch as the screw groove of the drive shaft. This guide member is made up of a guide groove formed on the drive shaft in the axial direction, and an adjusting means for adjusting the distance between the screw groove of the guided member, which is adapted to be guided along the guide groove, and the ball screw groove of the ball screw nut is provided. With this arrangement, the balls can smoothly be moved and the drive shaft can securely be moved along with the rotation of the ball screw nut.

The fixing means may be provided with a stress sensor for detecting a torsion force of the drive shaft acting on the fixing means. With this arrangement, it is possible to easily detect a rotational force that has been unexpectedly acted on the drive shaft during its axial motion and to therefore achieve operation with improved accuracy and at high speed, as well as energy saving, giving an advantage to securely control the drive shaft moving apparatus.

Where the guided member is so arranged as to be guided by the guide member via balls, the guided member can be smoothly moved while being guided by the guide member.

DETAILED DESCRIPTION OF THE PREFERRED EMBODIMENTS

An embodiment of the present invention will be hereinafter described with reference to the drawings.

Figure 1:
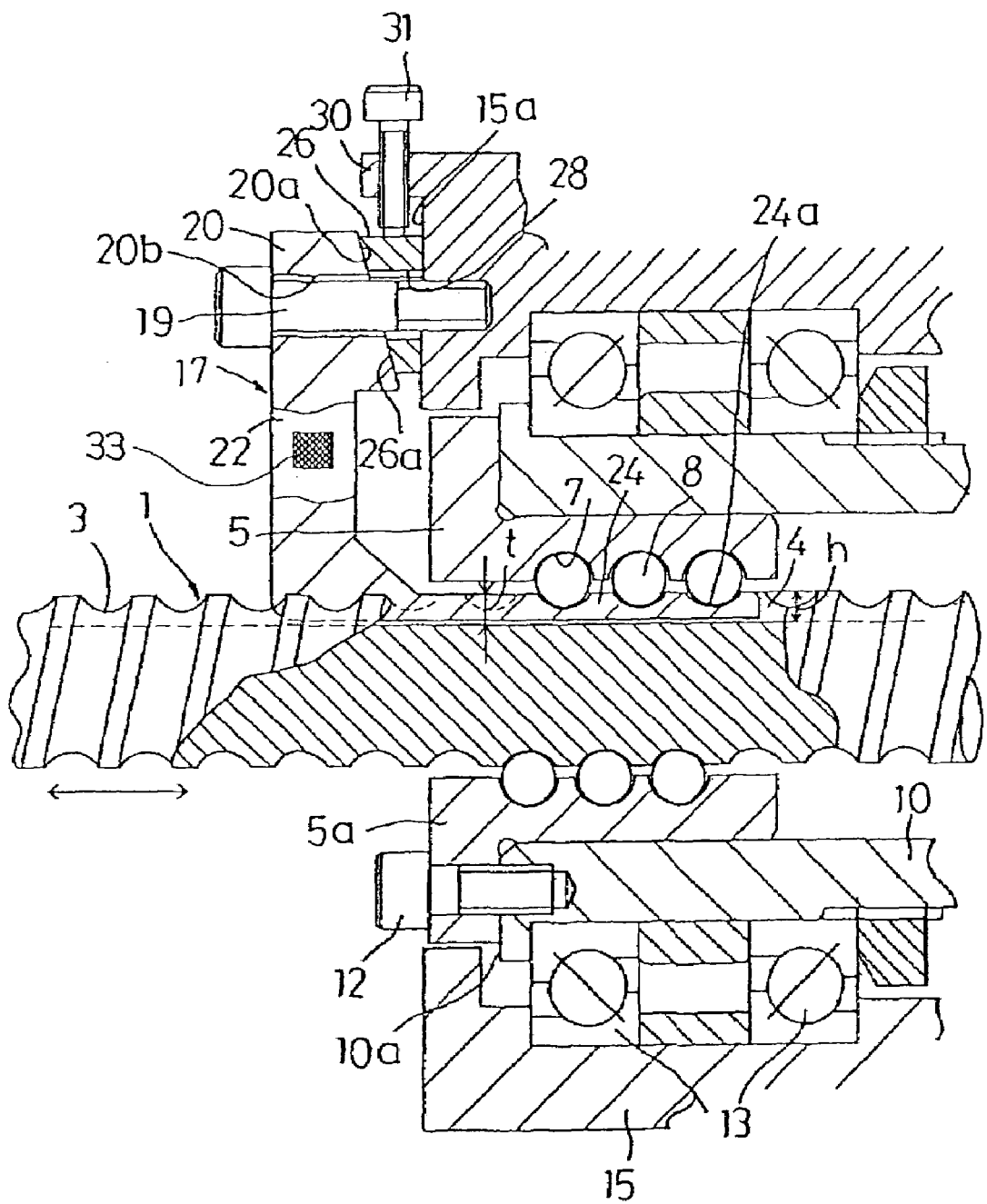
FIG. 1 is a cross sectional front view illustrating an essential portion of a first embodiment of the present invention.
Figure 2:
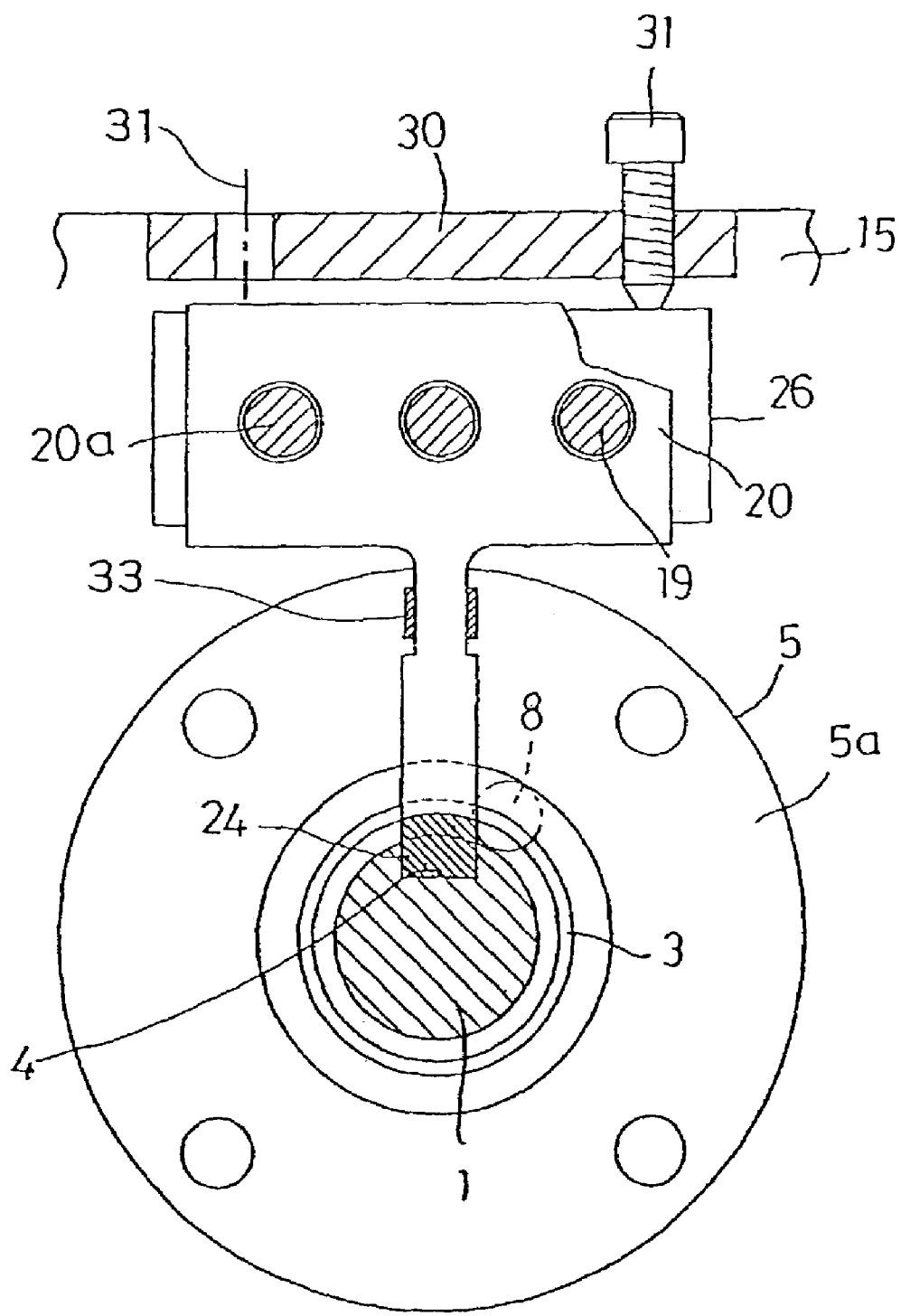
FIG. 2 is a cross sectional side view of the essential portion of FIG. 1.

FIGS. 1 and 2 illustrate the first embodiment of the present invention, in which a reference numeral 1 represents a ball screw shaft as the drive shaft, which has an outer circumference on which ball screw groove 3 in spiral shape is formed. The outer circumference of the ball screw shaft 1 also forms thereon guide groove 4 as a guiding member extending across substantially the entire length of the shaft 1 in its axial direction.

Fitted around the ball screw shaft 1 is ball screw nut 5 formed in tubular shape with flange member 5a on its end.

The ball screw nut 5 has an inner circumference on which ball screw groove 7 formed in spiral shape so as to be adapted in shape to the ball screw groove 3 (or having the same pitch as that of the ball screw groove 3). A number of balls 8 are rollably interposed between the ball screw groove 7 of the nut 5 and the ball screw groove 3 of the ball screw shaft 1. The ball screw nut 5 is formed with a circulation passage (not shown) for the balls 8, enabling the respective balls 8 to roll along the screw grooves of the ball screw shaft 1 and the ball screw nut 5, following a spiral path along with the relative rotation between the shaft and the nut, and return to an original position via a return passage, thus enabling repeated circulation as well known in the prior art.

Fitted around the ball screw nut 5 is input shaft 10 for rotating the ball screw nut 5. The flange member 5*a* of the ball screw nut 5 is secured to end surface 10*a* of the input shaft 10 by bolt 12 so as to be integrally rotated with the input shaft 10. The input shaft 10 is rotatably supported via bearings 13 on main flame 15 of a fixed side. The input shaft 10 is arranged so as to be rotatable in a predetermined direction, or either a clockwise or counterclockwise direction by a motor (not shown).

The main flame 15 is provided with, for example, a single or plural fixing means 17 for restraining the rotation of the ball screw shaft 1 (this embodiment will be described by taking for example an arrangement with a single fixing means 17). Specifically, the fixing means 17 includes mounting member 20 secured to front side 15*a* of the main flame 15 via bolt 19, arm member 22 extending from the mounting member 20 toward the ball screw shaft 1, and scraper member 24 as a guided member extending from the arm member 22 so as to be fittingly engaged with guide groove 4 of the ball screw shaft 1. The scraper member 24 extends between the ball screw nut 5 and the ball screw shaft 1. The scraper member 24 has an end extending closer to the opposite end of the ball screw nut 5, in which the length of the scraper member 24 may be varied according to needs.

Clearance adjusting spacer 26 is interposed between rear side 20*a* of the mounting member 20 and front side 15*a* of the main flame 15. The rear side 20*a* of the mounting member 20 is in contact with the front side 26*a* of the clearance adjusting spacer 26. Also, the rear side 20*a* of the mounting member 20 and the front side 26*a* of the clearance adjusting spacer 26 are formed to have slanted surfaces, so that the mounting member 20 and the front side 15*a* of the main flame 15 are gradually moved away from each other as the clearance adjusting spacer 26 is slightly moved toward the ball screw shaft 1.

The clearance adjusting spacer 26 forms therein through-hole 28 having a diameter slightly larger than the bolt 19, enabling the bolt 19 to pass therethrough. The mounting member 20 also forms therein through-hole 20*b* having a diameter slightly larger than the bolt 19, enabling the bolt 19 to pass therethrough. Accordingly, the vertical movement of the clearance adjusting spacer 26 enables fine positional adjustment of the scraper member 24 of the fixing means 17 with respect to the main flame 15 in the diametrical direction and lengthwise direction 5 of the ball screw shaft 1. Support member 30 projects from an upper side of an end of the main flame 15 to have a portion in meshed engagement with preload bolt 31 for downwardly pressing the clearance adjusting spacer 26. Here, the clearance adjusting spacer 26, the bolt 19 and the preload bolt 31 together constitute an adjusting means.

The scraper member 24 has thickness t which is set equivalent to or smaller than height h of the guide groove 4.

The scraper member 24 has an outer surface on which ball screw groove 24*a* having the same pitch as that of the ball screw groove 3 of the ball screw shaft 1 is formed. When the fine positional adjustment of the scraper member 24 is made in the diametrical and lengthwise directions of the ball screw shaft 1 by the adjusting means, thereby adjusting the position of the ball screw groove 24*a* of the scraper member 24 with respect to the ball screw groove 3 of the ball screw shaft 1, and the clearance between the ball screw groove 24*a* of the scraper member 24 and the ball screw groove 7 of the ball screw nut 5, the balls 8 can roll along the ball screw groove 24*a* of the scraper member 24 without jolting motion (the clearance may be set at substantially 0 or preload may be applied). Thus, the ball screw groove 24*a* of the scraper member 24 and the ball screw groove 3 of the ball screw shaft 1 together can form a continuous passage, enabling the balls 8 to roll as guided therealong and smoothly move without jolting motion.

Provided on the arm member 22 of the fixing means 17 is stress sensor 33 for detecting a torsion force of the drive shaft (ball screw shaft) 1 acting on the fixing means. As the sensor 33, it can be cited a distortion or magnetometric sensor.

Now, the description will be made for the operation of the apparatus according to this embodiment. The drive shaft moving apparatus having the above arrangement is mounted, for example, on a mounting member of a machine tool or robot (not shown) by securing the main flame 15 thereto. The ball screw shaft 1 is in this case used for reciprocal movement of a desirable cylinder rod of a cylinder.

By the actuation of a motor, the ball screw nut 5 is rotated. This rotation of the ball screw nut 5 allows the ball screw shaft 1 to axially slide while being prevented from rotating by the scraper member 24 of the fixing means 17 guided along the guide groove 4, thus moving forward or backward according to the rotational direction of the motor.

According to this embodiment, the rotation of the ball screw shaft 1 can be prevented by a simple structure with the single fixing means 17 engaged with the guide groove 4. Also, this simple structure can advantageously lower manufacturing costs.

As additional advantages, direct detection of a torsion force acting on the fixing means 17 by the stress sensor 33 provided in the fixing means 17 can achieve operation with improved accuracy and at high speed, as well as energy saving, in comparison with a conventional arrangement where the electric current value of the motor, which motor rotates the ball screw nut 5, is measured to detect the torque of the drive shaft.

Figure 3:
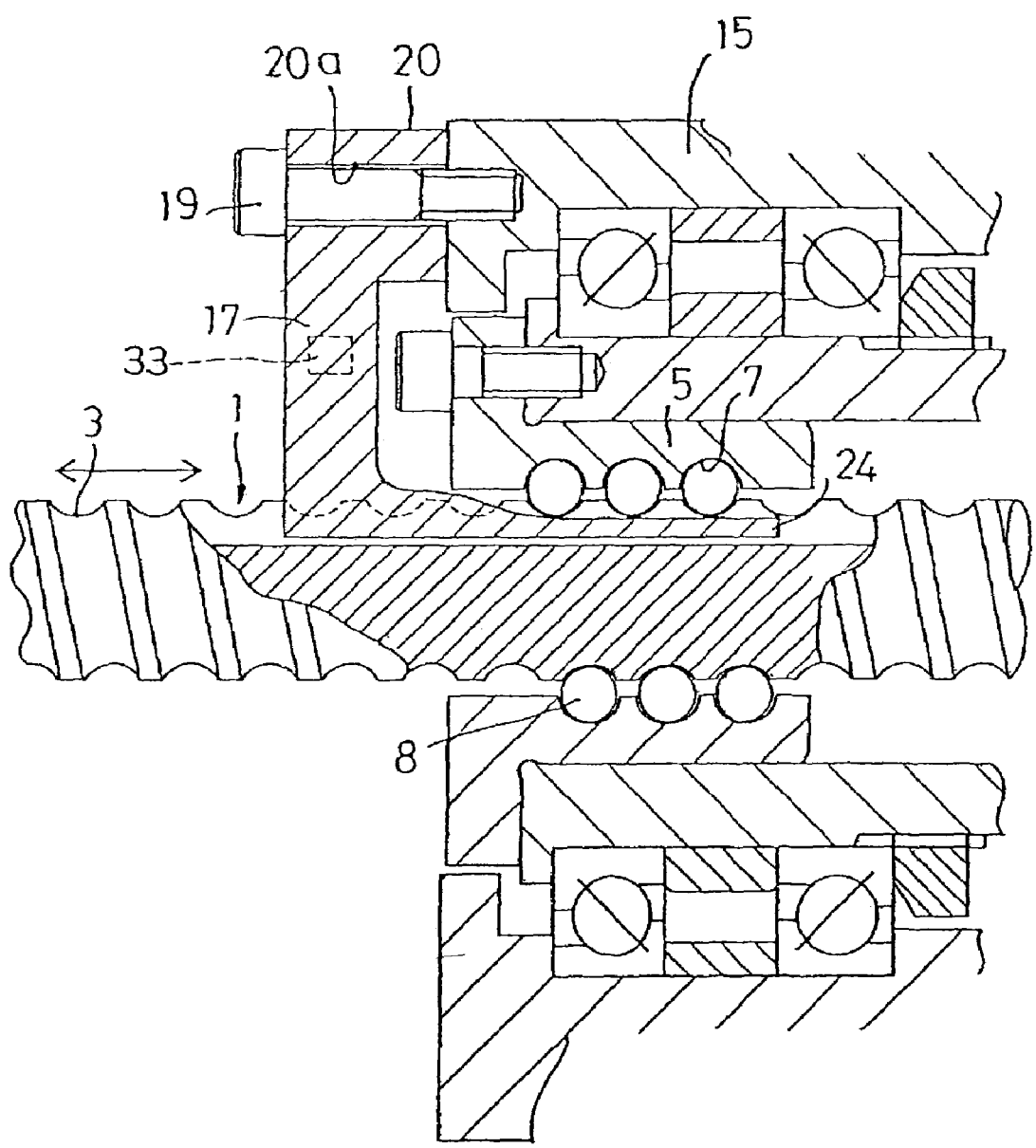
FIG. 3 is a cross sectional front view illustrating an essential portion of a second embodiment of the present invention.
Figure 4:
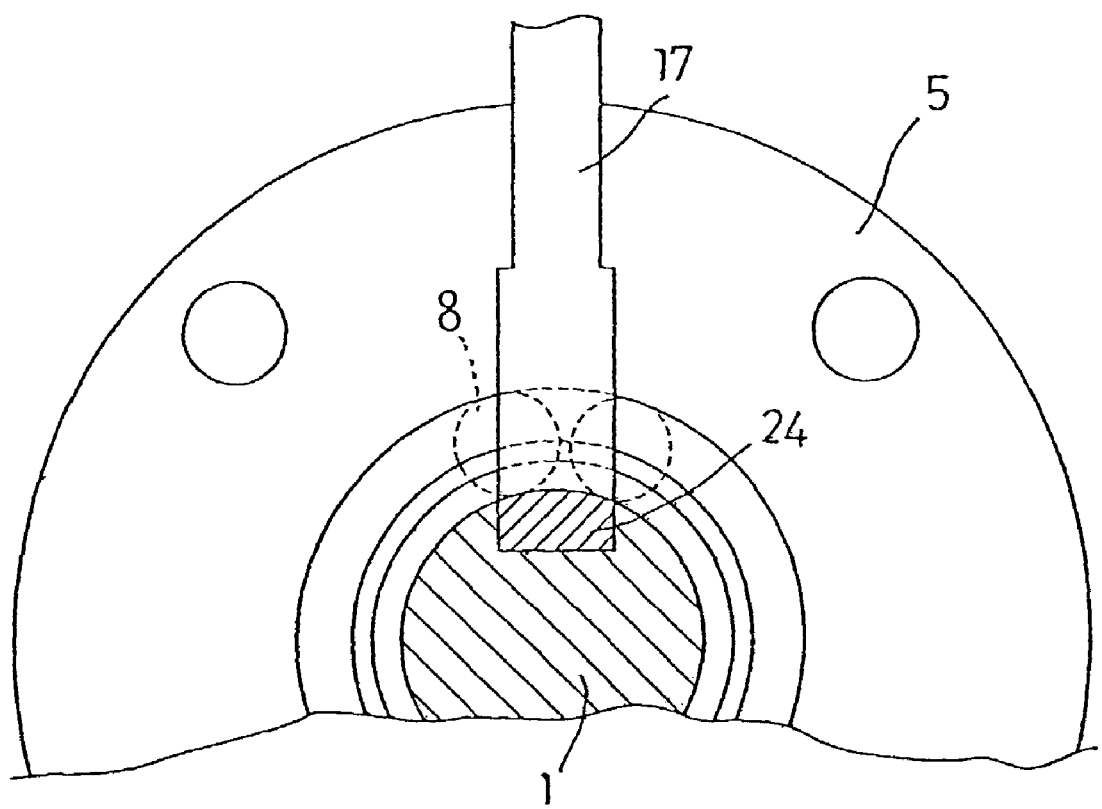
FIG. 4 is a cross sectional side view of the essential portion of FIG. 3.

The present invention is not necessarily limited to this embodiment, and may be embodied as in the second embodiment of FIGS. 3 and 4. The same reference codes will be assigned for identical parts of the first embodiment to omit the description thereof.

The scraper member 24 of the fixing means 17 is not provided with the ball screw groove 24*a*. Instead, the outer surface of the scraper member 24 is set to the same level as the bottom of the ball screw groove 3 of the ball screw shaft 1 for enabling the balls 8 to pass therethrough. The outer surface of the scraper member 24 is also formed in convex shape. According to this embodiment, the balls 8 rolling over the outer surface of the scraper member 24 are guided to the ball screw groove 7 of the ball screw nut 5, so that they can be smoothly moved along the groove without falling out therefrom.

The mounting member 20 of the fixing means 17 is directly mounted without providing the clearance adjusting spacer 26. The distance between the scraper member 24 and the ball screw nut 5 is finely adjustable. The absence of the ball screw groove 24a in the scraper member 24 of the fixing means 17 omits the necessity to finely adjust the position of the ball screw shaft 1 in the lengthwise direction of the ball screw shaft 1.

Figure 5:
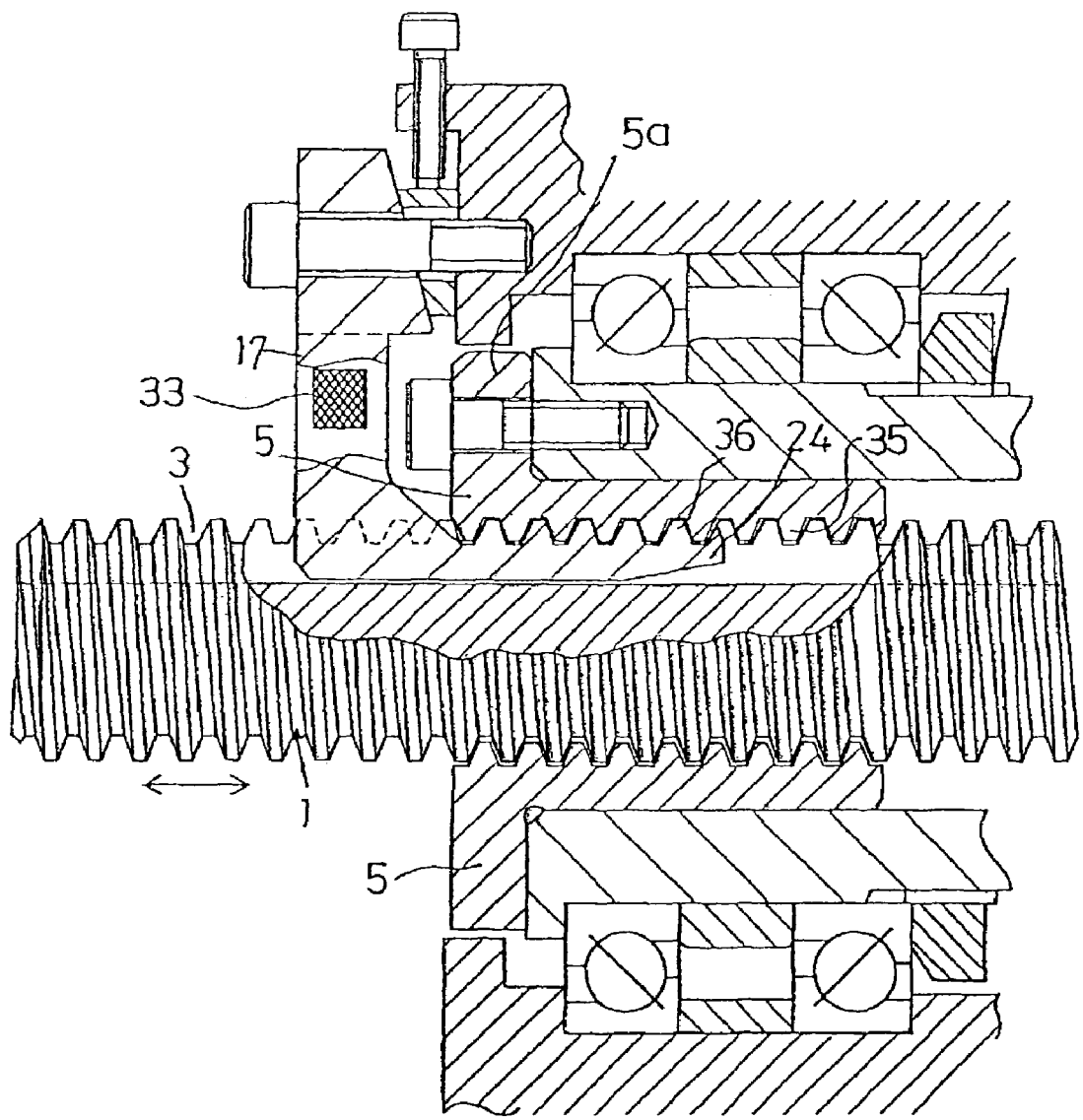
FIG. 5 is a cross sectional front view illustrating an essential portion of a third embodiment of the present invention.

FIG. 5 illustrates the third embodiment. The same reference codes will be assigned for the identical parts of the first embodiment to omit the description thereof. In this embodiment, sliding screw shaft (drive shaft) 1 with screw groove (male screw portion) 3 and nut 5 with screw groove (female screw portion) 35 threadedly engageable with the screw portion of the sliding screw shaft 1 are provided. Also, the scraper member 24 of the fixing means 17 is formed with screw groove (screw portion) 36 having the same pitch as that of the screw groove of the sliding screw shaft 1.

In the third embodiment, the screw portion 36 of the scraper member 24 constitutes a part of the screw portion of the sliding screw shaft 1, enabling the smooth rotation of the nut 5 and lowered manufacturing cost by a simple structure.

Figure 6:
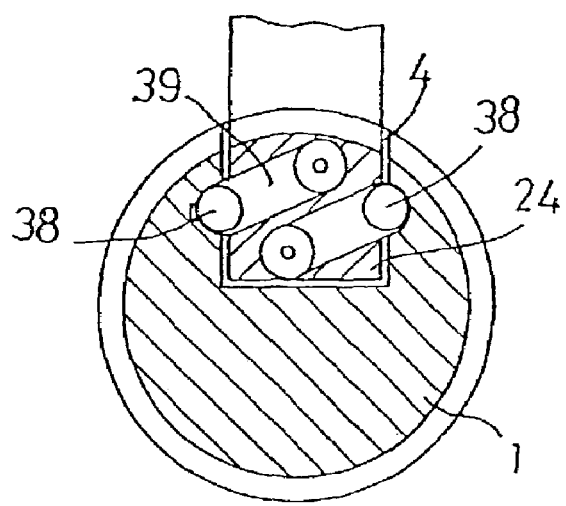
FIG. 6A is a cross sectional view illustrating another embodiment of the fixing means.
FIG. 6B is a cross sectional view illustrating a drive shaft and the fixing means of another embodiment.
Figure 6:
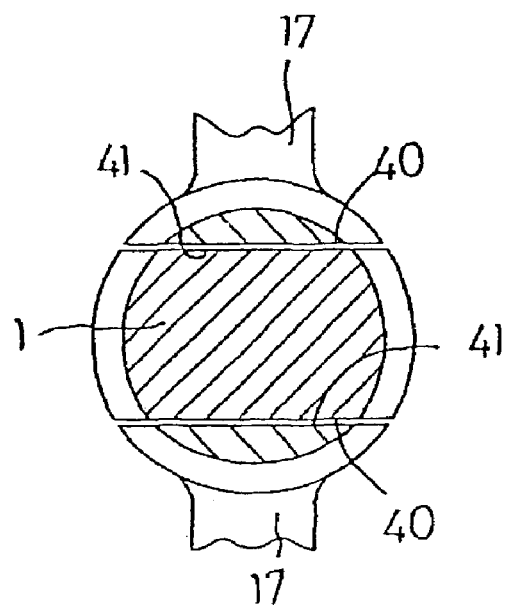
Figure 7:
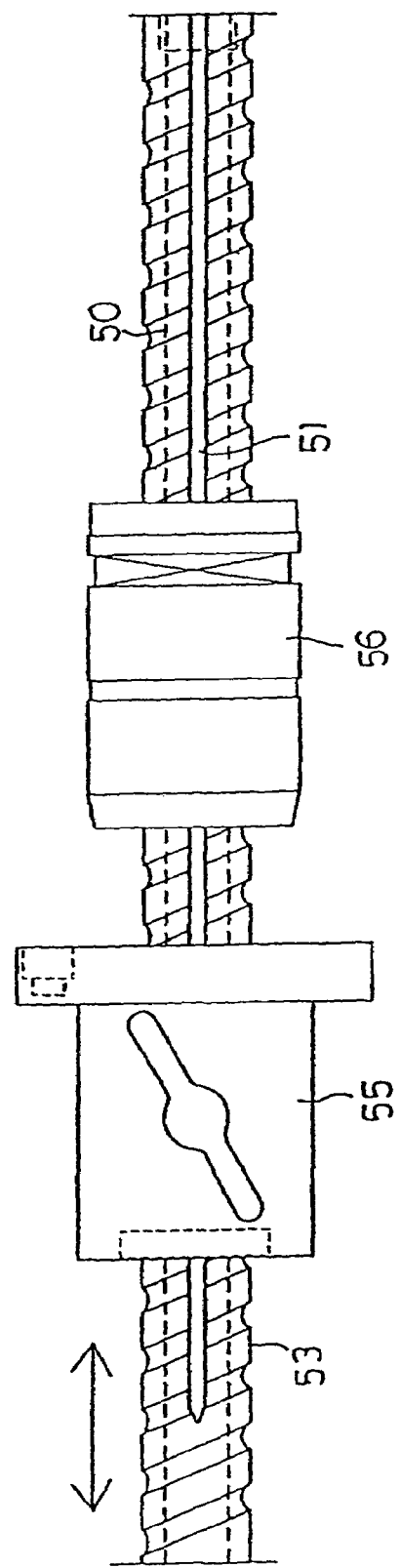
FIG. 7 is a schematic front view illustrating a prior art.

The present invention is not necessarily limited to the above embodiment. As illustrated in FIG. 6A, the guided member (scraper member 24) may be arranged to be guided along the guide member (guide groove) 4 through balls. Specifically, the scraper member 24 is provided with balls 38 capable of rolling along the guide groove 4, and circulation means 39 in the form of such as a return pipe or return groove, so that the balls 38 can roll and circulate. The scraper member 24 can be more smoothly moved along the guide groove 4 by providing the balls 38 in the scraper member 24.

Moreover, the guide member is not limited to the guide groove 4. As illustrated in FIG. 6B, the drive shaft 1 is provided with flat sides 40, while the fixing means 17 is provided with sliding flat sides (guided member) 41 sliding along the flat sides 40. A plurality of flat sides 40 are provided on the drive shaft 1, and therefore a plurality of fixing means 17 may be provided.

Since the scraper member 24 of the fixing means 17 is fittingly engaged with the guide groove 4, the drive shaft 1 cannot be rotated relative to the main flame 15 when it has been secured in position. In this respect, the drive shaft 1 may be designed to be rotated with a simple arrangement that the nut 5 is secured in position while the fixing means 17 (main flame 15) is rotatably disposed. In addition, by having the main flame 15 and the nut 5 rotatable, the drive shaft 1 can be moved forwards and backwards along the axis while being rotated.

What is claimed is:

1. A drive shaft moving apparatus, comprising:
a drive shaft with a screw groove formed in a spiral shape;
a nut fitted around the drive shaft, the nut being rotatably supported on a main flame so as to allow the drive shaft to axially move;
a fixing means being provided on a side of the main flame for preventing the drive shaft from rotating; and
the fixing means including a guided member being capable of moving along a guide member formed on the drive shaft in the axial direction, where the guided member is disposed between the nut and the drive shaft and guided by the guide member via balls.

2. A drive shaft moving apparatus comprising:
a drive shaft with a screw groove formed in a spiral shape;
a nut fitted around the drive shaft, the nut being rotatably supported on a main flame so as to allow the drive shaft to axially move;
a fixing means being provided on a side of the main flame for preventive the drive shaft from rotating;
the fixing means including a stress sensor for detecting a torsion force of the drive shaft acting on the fixing means; and
the fixing means also including a guided member being capable of moving along a guide member formed on the drive shaft in the axial direction, the guided member being disposed between the nut and the drive shaft.

3. A drive shaft moving apparatus comprising;
a drive shaft with a screw groove formed in a spiral shape;
a ball screw nut fitted around the drive shaft via balls rolling along the screw groove, the ball screw nut being rotatably supported on a main flame so as to allow the drive shaft to axially move;
a fixing means being provided on a side of the main flame for preventing the drive shaft from rotating; and
the fixing means including a guided member being capable of moving along a guide member formed on the drive shaft in the axial direction, the guided member being disposed between the nut and the drive shaft in such a manner as to allow the balls to roll thereover and being guided by the guide member via balls.

4. The drive shaft moving apparatus according to claim 3 where the ball screw nut includes a ball screw groove, and where the guided member includes a screw groove having the same pitch as the screw groove of the drive shaft, and where the guide member comprises a guide groove formed on the drive shaft in the axial direction, and an adjusting means for adjusting the distance between the screw groove of the guided member, which is adapted to be guided along the guide groove, and the ball screw groove.

5. A drive shaft moving apparatus comprising:
a drive shaft with a screw groove formed in a spiral shape;
a ball screw nut fitted around the drive shaft via balls rolling along the screw groove, the ball screw nut being rotatably supported on a main flame so as to allow the drive shaft to axially move;
a fixing means being provided on a side of the main flame for preventing the drive shaft from rotating;
the fixing means including a stress sensor for detecting a torsion force of the drive shaft acting on the fixing means; and
the fixing means also including a guided member being capable of moving along a guide member formed on the drive shaft in the axial direction, the guided member being disposed between the nut and the drive shaft in such a manner as to allow the balls to roll thereover.

6. The drive shaft moving apparatus according to claim 5, where the ball screw nut includes a ball screw groove, and where the guided member includes a screw groove having the same pitch as the screw groove of the drive shaft, the guide member comprising a guide groove formed on the drive shaft in the axial direction, and an adjusting means for adjusting the distance between the screw groove of the guided member which is adapted to be guided along the guide groove, and the ball screw groove.

* * * * *

UNITED STATES PATENT AND TRADEMARK OFFICE
CERTIFICATE OF CORRECTION

PATENT NO. : 6,968,752 B2 Page 1 of 1
APPLICATION NO. : 10/275662
DATED : November 29, 2005
INVENTOR(S) : Shimada It is certified that error appears in the above-identified patent and that said Letters Patent is hereby corrected as shown below:

Column 6,
Line 7, delete "preventive" and insert -- preventing --.

Signed and Sealed this

Twenty-seventh Day of June, 2006

JON W. DUDAS
*Director of the United States Patent and Trademark Office*